May 28, 1963  D. R. FRIANT  3,091,097
METHOD OF REMOVING IMPURITIES FROM A COMPRESSED GAS
Filed Aug. 11, 1960
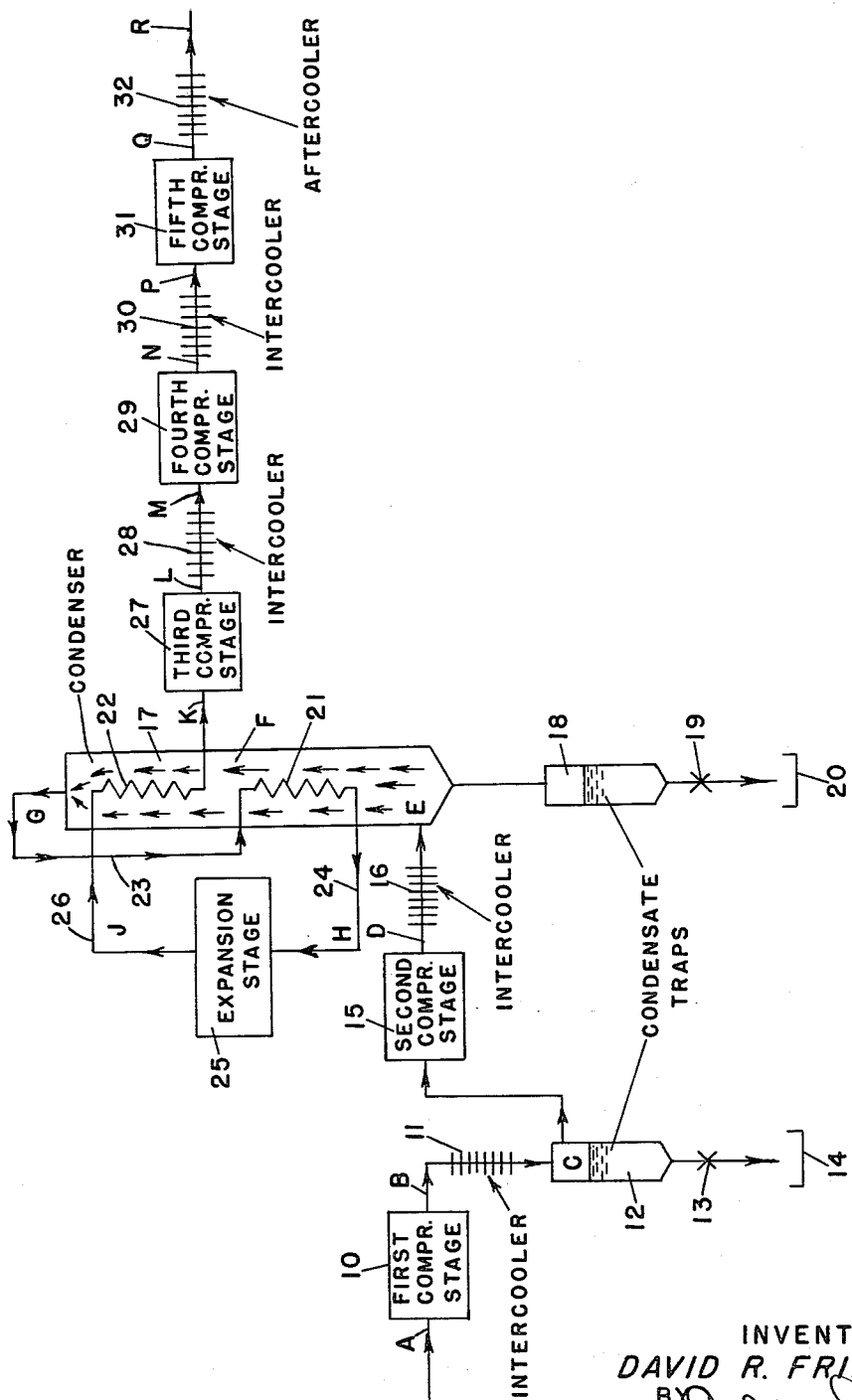
INVENTOR
DAVID R. FRIANT
BY
HIS ATTORNEY

United States Patent Office 3,091,097
Patented May 28, 1963

3,091,097
METHOD OF REMOVING IMPURITIES FROM A COMPRESSED GAS
David R. Friant, Catlin, N.Y., assignor to Ingersoll-Rand Company, New York, N.Y., a corporation of New Jersey
Filed Aug. 11, 1960, Ser. No. 48,874
6 Claims. (Cl. 62—85)

This invention relates to a method of removing impurities from a compressed gas and is primarily concerned with a method of removing water vapor and oil vapor from compressed air.

In the past it has been the practice to use one or more compression stages in association with desiccant cartridges. First the gas goes through the compression stage or tages and then it goe through the desciccant cartridges which remove water vapor or other impurities. The desiccant cartridges have to be replaced every so often and it takes time and effort to replace them and the attendant may forget to do it which could cause liquid water to get into the machine in which it is to be used. There is no easy and reliable way to measure dew point in the desiccant cartridge method. A desiccant cartridge is a chamber containing a filter and a desiccant such as silica gel for removing water vapor or other impurities from a gas.

In the past it has also been the practice to reactivate the desiccant periodically by any of several means. In this desiccant method it is difficult to measure the dryness of the air being delivered and it costs at least $1000 for the regenerative type regardless of size.

In the past it has further been the practice to move air through a heat exchanger which is cooled by the outgoing air. Then the air flows to a condenser evaporator. Here the final cooling of the air takes place. Moisture and oil vapors are condensed and drop into the condensate collection chamber. The air is then passed through a filter cartridge element which collects foreign matter. The cool, dry air then re-enters the heat exchanger where it is reheated by the incoming hot air before entering the lines to the receiver or storage tank. The disadvantages of this method are that a separate refrigerant compressor and tanks and an expansion orifice are all needed.

The method of the present invention is comprised of a plurality of compression stages and in each stage the pressure is increased and the temperature is increased over what it was in the preceding compression stage. A cooling means is used to cool the gas after each compression stage resulting in a decrease in the temperature of the gas and in a majority of the locations the cooling means increases the efficiency of compression by approximating an isothermal process. An expansion stage is provided which decreases the pressure and decreases the temperature. The method of the present invention provides extremely low temperatures. One advantage of the present invention is that the temperature can be measured to find out how dry the air is. The invention has many other advantages which are set forth later in this specification.

An object of the invention is to provide an improved method of removing impurities from a compressed gas.

Another object of the invention is to provide a method of removing impurities from a compressed gas which does not require a separate refrigerant.

Another object of the invention is to provide a method of removing impurities from a compressed gas wherein measuring devices and controlling devices and warning devices can easily be used.

A further object of the invention is to provide a method of removing impurities from a compressed gas wherein the condensate trapping problem is reduced.

A still further object of the invention is to provide a method of removing water vapor from compressed air wherein no provisions are necessary for trapping condensed water beyond the third compression stage.

The foregoing and other objects of the invention will be apparent from the arrangement shown in the accompanying drawing wherein:

The FIGURE is a schematic drawing of a method of removing water vapor and oil vapor from compressed air.

In the present invention there are five stages of compression. These five compression stages can all take place in one compressor and preferably a single compressor is ued for all five stages. However, a plurality of compressors can be used for the five stages if desired. The compressor can be of the piston and cylinder type, the bladed type, the vane type, or the lobed type. In the present invention an expander is required to accomplish the expansion stage. This expander can be a piston and cylinder, a turbine, a vane motor, or a gear motor. Oil is ordinarily used to lubricate the moving parts of the compressor and it is ordinarily desirable to remove the resulting oil vapor from the air.

In the drawings, air from the atmosphere enters the first compression stage 10 at point A. In the first compression stage 10 the pressure of the air is increased and the temperature of the air is increased. The air then passes into an intercooler 11 where its temperature is decreased and some of the water vapor is condensed into water and some of the oil vapor is condensed into liquid oil and the decrease in temperature also prevents heat damage to the oil and the parts. The intercooler 11 increases the efficiency of compression by approximating an isothermal process. The water vapor that condenses into water in intercooler 11 and the oil vapor that condenses into liquid oil flow into a condensate trap 12. At the lower end of the condensate trap 12 a manually operated or automatically operated valve 13 is provided whereby the condensed water can be drained into a drain trough 14. The air then flows into the second compression stage 15 where its pressure is increased and its temperature is increased and the air then flows through an intercooler 16 where its temperature is decreased and some of the water vapor and oil vapor is condensed into water and oil respectively and this condensed water and condensed oil flow into a condenser 17 and out the bottom of the condenser into a condensate trap 18. At the lower end of condensate trap 18 a manually operated or automatically operated valve 19 is located and upon operation of this valve the condensed water and condensed oil are drained into a drain trough 20. It is to be noted that the drain troughs 14 and 20 are not necessary as the condensed oil and the condensed water can be drained on the ground. The air then enters the condenser 17 and flows around a cooling coil 21 where its temperature is decreased and this cooling oil causes some of the water vapor to condense into water and to drain into the condensate trap 18. The pressure of the air in the area of cooling coil 21 stays approximately constant. The upper part of coil 21 may have frost or ice on it. The air then flows around a cooling coil 22 where its temperature is reduced. The pressure of the air in the area of cooling coil 22 stays approximately constant. The cooling coil 22 may have frost or ice upon it. The condenser 17 can be relatively small because there is less water to be condensed than at previous points in the process and because the air has a low specific volume and hence stays in the condenser for a relatively long time. The condenser can be constructed of relatively thin material because the pressure is not excessive. The air in the condenser 17 then flows into a conduit 23 and from this conduit it flows through the interior of the cooling coil 21 where it absorbs heat from the air passing around the outside of the cooling oil. The air then flows through a conduit 24 into an expander 25 where its pressure is decreased and its temperature is decreased. The main purpose of the expander 25 is to decrease the temperature. The expander 25 can be relatively small because the expansion takes place at a high pressure and therefore the air occupies relatively little space. However, the pressure is not so high that strength and volumetric efficiency are serious problems. At point G all of the water that is going to condense out has condensed out so that there will be no water vapor between H and J that will condense out even though there is a minute amount of water vapor still left in the air. Thus condensation in the expander 25 is prevented. The air then flows into a conduit 26 and then through the interior of the cooling coil 22 where it absorbs heat from the air passing around the cooling coil. The air then enters the third compression stage 27 where its pressure is increased and its temperature is increased. The air then flows through an intercooler 28 which reduces the temperature of the air and some of the oil vapor is condensed into liquid oil. The intercooler 28 increases the efficiency of compression by approximating an isothermal process. The air then enters the fourth compression stage 29 where its pressure is increased and its temperature is increased. The air then enters the intercooler 30 where its temperature is decreased and some of the oil vapor is condensed into liquid oil. The intercooler 30 increases the efficiency of compression by approximately an isothermal process. The air then enters the fifth compression stage 31 where its pressure is increased and its temperature is increased. The air then flows through the aftercooler 32 where its temperature is decreased. This dry compressed air is then allowed to flow into a storage tank where it is ready to be used. It should be noted that the aftercooler 32 may be omitted and also the fifth compression stage 31 may be omitted and also the fourth and fifth compression stages 29 and 31 may be omitted and also the third, fourth and fifth compression stages 27, 29, and 31 may be omitted.

The table below shows the pressures and temperatures and pounds of water per pound of dry air at locations A, B, C, D, E, F, G, H, J, K, L, M, N, P, Q, and R. The figures listed in this table apply to an example in which air saturated with water vapor at 70° F. and 14.7 pounds per square inch absolute is dried and compressed to 6000 pounds per square inch gauge.

| Location | Pressure, Pounds Per Square Inch Gauge | Temperature, Degrees Fahrenheit | Pounds of Water Per Pound of Dry Air |
| --- | --- | --- | --- |
| A | 0 | 70 | $1.6 \times 10^{-2}$ |
| B | 50 | 350 | $1.6 \times 10^{-2}$ |
| C | 50 | 90 | $6.5 \times 10^{-3}$ |
| D | 260 | 380 | $6.5 \times 10^{-3}$ |
| E | 260 | 90 | $1.7 \times 10^{-3}$ |
| F | 260 | −72 | $6 \times 10^{-7}$ |
| G | 260 | −89 | $1.5 \times 10^{-7}$ |
| H | 260 | 80 | $1.5 \times 10^{-7}$ |
| J | 50 | −98 | $1.5 \times 10^{-7}$ |
| K | 50 | −82 | $1.5 \times 10^{-7}$ |
| L | 410 | 295 | $1.5 \times 10^{-7}$ |
| M | 410 | 100 | $1.5 \times 10^{-7}$ |
| N | 1,750 | 410 | $1.5 \times 10^{-7}$ |
| P | 1,750 | 100 | $1.5 \times 10^{-7}$ |
| Q | 6,000 | 425 | $1.5 \times 10^{-7}$ |
| R | 6,000 | 90 | $1.5 \times 10^{-7}$ |

From the table it will be seen that extremely low temperatures are attained.

The advantages of applicant's method are as follows: There is no desiccant required and no replacement of cartridges. A separate refrigerant such as Freon is not needed for the coils 21 and 22. Since a separate refrigerant is not needed a refrigerant compressor and tanks and an expansion orifice are not needed and which would all be needed when a separate refrigerant is used. It is easy to put controls or warning devices on applicant's apparatus, that is, the temperature at G can be measured to find out how dry the air is. The condensate trapping problem beyond the third compression stage 27 is not as great as it would be if the expander 25 and condenser 17 were not used. No provisions are necessary for trapping condensed water beyond the third compression stage 27. Any condensate beyond the third compression stage will be that of oil vapor into liquid oil. This oil is for lubricating the moving parts of the compressor. Although oil carried over from one stage to the succeeding stage does not provide the only lubrication for the succeeding stage, the small amount of oil which condenses in the high pressure coolers assists in lubricating the moving parts of the succeeding stage particularly the valves if the compressor is one of the piston and cylinder type. In the third compression stage 27 since the temperature is very low a higher compression pressure ratio can be attained than in any other compression stage without damaging the parts of the compressor and without damaging the lubricant which is oil. If oil gets too hot it will turn into a solid or gummy carbonaceous material. This carbonaceous material will deposit on the valves and cause faulty operation of the valves. In the plain desiccant and regenerative desiccant systems priority valves were needed. A priority valve is one which prevents air from flowing through the desiccant cartridges unless the pressure exceeds some minimum value. In applicant's method no priority valves are needed to protect the desiccant cartridges since they are not used in this apparatus.

Dry compressed air is used to start jet engines and if a slug of water gets into the blades of a jet engine it is likely to cause serious damage or even complete destruction of the engine. Dry compressed air is also used in instruments operated pneumatically.

This could also be a nitrogen compressor in which case one impurity is water and in which pure nitrogen is desired. This could also be a methane compressor in which case one impurity may be butane and in which case pure methane is desired.

What is claimed is:

1. A method of removing impurities from a compressed gas comprising the following steps in the order named, of:

(a) alternately compressing and cooling the gas a plurality of times to progressively increase its pressure each time the gas is compressed and to alternately increase and decrease its temperature at each increased pressure for causing condensation of some of the impurities that drain off each time temperature is decreased, (b) passing the gas through locations to decrease the temperature in two steps at approximately constant pressure causing additional impurities to condense and drain off, (c) moving the gas through a location where it absorbs heat, (d) expanding the gas to decrease its pressure and temperature, (e) moving the gas through a location where it absorbs heat, (f) compressing the gas at least one time to increase its pressure and temperature, and (g) cooling the gas at its increased pressure so the temperature of the compressed gas substantially corresponds to the temperature of the impure gas prior to processing.

2. The method of removing impurities from a compressed gas comprising the following steps in the order named, of:

(a) alternately compressing and cooling the gas a plurality of times to progressively increase its pressure each time the gas is compressed and to alternately increase and decrease its temperature at each increased pressure for causing condensation of some of the impurities that drain off each time temperature is decreased, (b) cooling the gas in steps at substantially constant pressure causing additional impurities to condense and drain off by passing the gas through two heat exchange means in series with one another, (c) heating the gas by passing it back through the first of the two heat exchange means in series to prevent condensation when expanded, (d) expanding the gas to decrease its pressure and temperature, (e) heating the gas by passing it back through the second of the two heat exchange means in series, (f) compressing the gas at least one time to increase its pressure and temperature, and (g) cooling the gas at its increased pressure so the temperature of the compressed gas substantially corresponds to the temperature of the impure gas prior to processing.

3. A method of removing impurities from a compressed gas comprising the following steps in the order named, of:

(a) alternately compressing and cooling the gas a plurality of times to progressively increase its pressure each time the gas is compressed and to alternately increase and decrease its temperature at each increased pressure for causing condensation of some of the impurities that drain off each time temperature is decreased, (b) passing the gas through locations to decrease the temperature in two steps at approximately constant pressure causing additional impurities to condense and drain off, (c) moving the gas through a location where it absorbs heat, (d) expanding the gas to decrease its pressure and temperature, (e) moving the gas through a location where it absorbs heat, (f) compressing the gas a plurality of times to increase its pressure and temperature each time the gas is compressed, and (g) cooling the gas after each time it is compressed to decrease its temperature at each increased pressure so the temperature remains within a constant range as the pressure progressively increases.

4. The method of removing impurities from a compressed gas comprising the following steps in the order named, of:

(a) alternately compressing and cooling the gas a plurality of times to progressively increase its pressure each time the gas is compressed and to alternately increase and decrease its temperature at each increased pressure for causing condensation of some of the impurities that drain off each time temperature is decreased, (b) cooling the gas in steps at substantially constant pressure causing additional impurities to condense and drain off by passing the gas through two heat exchange means in series with one another, (c) heating the gas by passing it back through the first of the two heat exchange means in series to prevent condensation when expanded, (d) expanding the gas to decrease its pressure and temperature, (e) heating the gas by passing it back through the second of the two heat exchange means in series, (f) compressing the gas a plurality of times to increase its pressure and temperature each time the gas is compressed, and (g) cooling the gas after each time it is compressed to decrease its temperature at each increased pressure so the temperature remains within a constant range as the pressure progressively increases.

5. A method of removing impurities from a compressed gas comprising the following steps in the order named, of:

(a) alternately compressing and cooling the gas a plurality of times to progressively increase its pressure each time the gas is compressed and to alternately increase and decrease its temperature at each increased pressure for causing condensation of some of the impurities that drain off each time temperature is decreased, (b) passing the gas through locations to decrease the temperature in two steps at approximately constant pressure causing additional impurities to condense and drain off, (c) moving the gas through a location where it absorbs heat, (d) expanding the gas to decrease its pressure and temperature, (e) moving the gas through a location where it absorbs heat, (f) compressing the gas a plurality of times to increase its pressure and temperature each time the gas is compressed, and (g) cooling the gas after each time it is compressed to decrease its temperature at each increased pressure so the temperature each time the gas is cooled substantially corresponds to the temperature of the impure gas prior to processing as the pressure progressively increases.

6. The method of removing impurities from a compressed gas comprising the following steps in the order named, of:

(a) alternately compressing and cooling the gas a plurality of times to progressively increase its pressure each time the gas is compressed and to alternately increase and decrease its temperature at each increased pressure for causing condensation of some of the impurities that drain off each time temperature is decreased, (b) cooling the gas in steps at substantially constant pressure causing additional impurities to condense and drain off by passing the gas through two heat exchange means in series with one another, (c) heating the gas by passing it back through the first of the two heat exchange means in series to prevent condensation when expanded, (d) expanding the gas to decrease its pressure and temperature, (e) heating the gas by passing it back through the second of the two heat exchange means in series, (f) compressing the gas a plurality of times to increase its pressure and temperature each time the gas is compressed, and (g) cooling the gas after each time it is compressed to decrease its temperature at each increased pressure so the temperature each time the gas is cooled substantially corresponds to the temperature of the impure gas prior to processing as the pressure progressively increases.

References Cited in the file of this patent

UNITED STATES PATENTS

| | | |
|---|---|---|
| 1,264,399 | Jones | Apr. 30, 1918 |
| 1,881,116 | Bottoms | Oct. 4, 1932 |
| 2,077,315 | Ewing et al. | Apr. 13, 1937 |
| 2,134,699 | Brewster | Nov. 1, 1938 |
| 2,267,761 | Steward | Dec. 30, 1941 |
| 2,818,454 | Wilson | Dec. 31, 1957 |
| 2,966,036 | Stowens | Dec. 27, 1960 |

FOREIGN PATENTS

| | | |
|---|---|---|
| 909,568 | Germany | Apr. 22, 1954 |
| 1,233,248 | France | May 2, 1960 |